United States Patent
Kato

(10) Patent No.: US 8,390,867 B2
(45) Date of Patent: Mar. 5, 2013

(54) FORM GENERATION SYSTEM AND FORM GENERATION METHOD

(75) Inventor: Yutaka Kato, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 1163 days.

(21) Appl. No.: 12/259,967

(22) Filed: Oct. 28, 2008

(65) Prior Publication Data

US 2009/0109479 A1   Apr. 30, 2009

(30) Foreign Application Priority Data

Oct. 31, 2007   (JP) .................. 2007-283542

(51) Int. Cl.
- *G06K 15/00* (2006.01)
- *G06F 3/12* (2006.01)
- *H04N 1/40* (2006.01)
- *G06F 17/00* (2006.01)
- *G06K 9/36* (2006.01)

(52) U.S. Cl. ............ 358/1.16; 358/1.15; 358/3.28; 358/3.24; 358/1.17; 358/1.18; 715/221; 715/222; 715/224; 715/225; 715/226; 382/277

(58) Field of Classification Search .......... None
See application file for complete search history.

(56) References Cited

U.S. PATENT DOCUMENTS

| | | | |
|---|---|---|---|
| 6,775,729 B1 * | 8/2004 | Matsuo et al. | 710/263 |
| 7,028,255 B1 * | 4/2006 | Ayers | 715/202 |
| 7,250,865 B2 * | 7/2007 | Maloney | 340/572.1 |
| 7,529,829 B2 * | 5/2009 | Kaneko et al. | 709/224 |
| 7,920,101 B2 * | 4/2011 | Lum et al. | 345/2.1 |
| 8,106,922 B2 * | 1/2012 | Lum et al. | 345/619 |
| 2007/0059006 A1 * | 3/2007 | Harigai et al. | 399/49 |
| 2007/0133882 A1 * | 6/2007 | Matsuno | 382/209 |
| 2007/0171464 A1 * | 7/2007 | Nakajima | 358/1.15 |

FOREIGN PATENT DOCUMENTS

| | | |
|---|---|---|
| JP | 2006-081119 | 3/2006 |
| WO | 2006030878 | 3/2006 |

* cited by examiner

*Primary Examiner* — Hilina S Kassa
(74) *Attorney, Agent, or Firm* — Canon U.S.A., Inc., IP Division

(57) ABSTRACT

Embodiments of the invention relate to a form management system that generates a form ID of the form to be created, on the basis of a form data ID, which is generated based on a template ID generated from a form template and form data to be overlaid thereon. In addition, the form management system may be capable of identifying and managing the form template and the form data for the generated form.

6 Claims, 12 Drawing Sheets

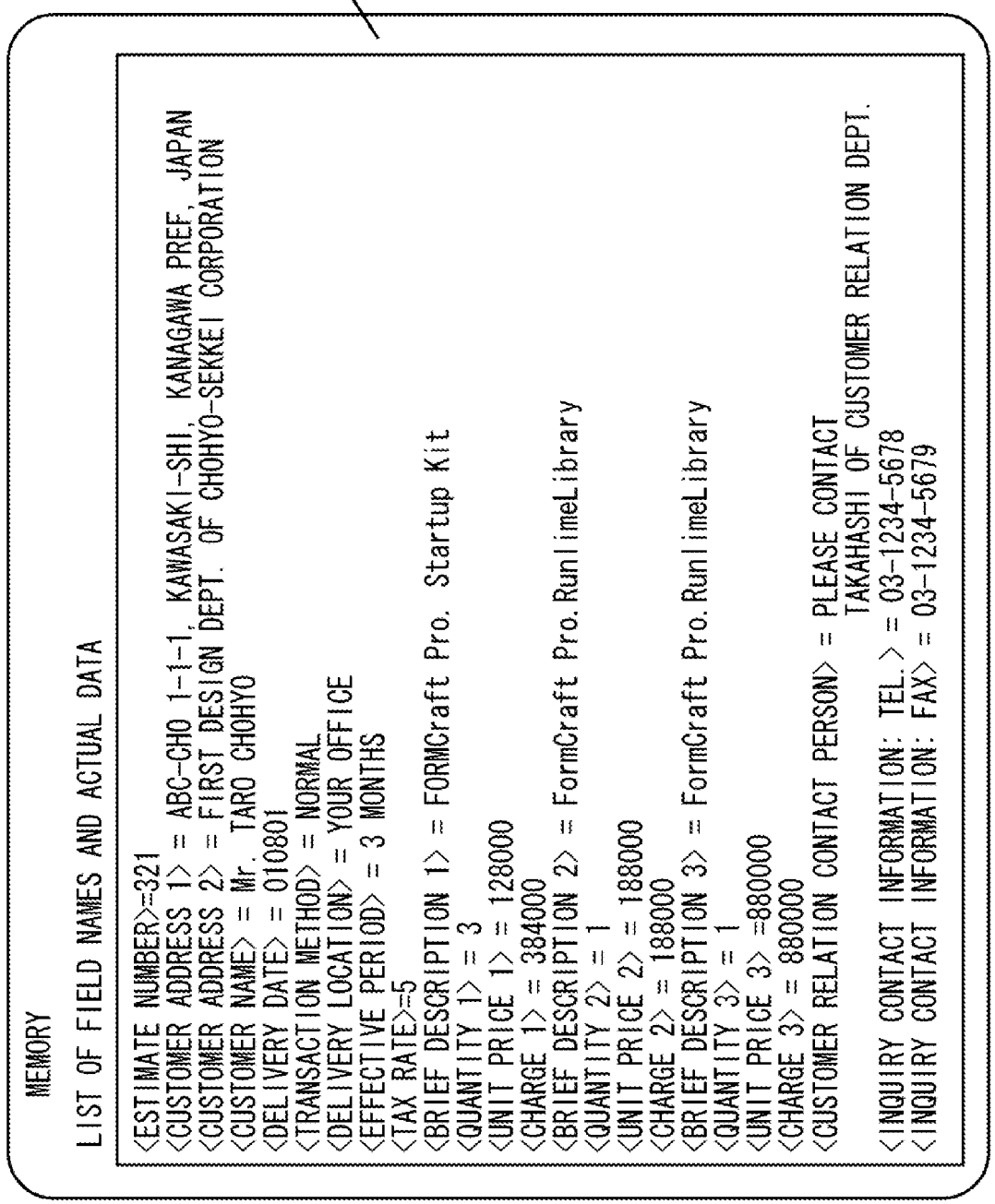

FORM GENERATION SYSTEM AND FORM GENERATION METHOD

BACKGROUND OF THE INVENTION

1. Field of the Invention

The present invention generally relates to a form generation system including an information processing apparatus configured to generate print data and a printing apparatus configured to receive the print data, which are in communication with each other via a network. The present invention also generally relates to a print management system, a printing apparatus, an information processing apparatus, and a method for controlling the systems and apparatuses.

2. Description of the Related Art

In recent years, high data security has become desired by the market. To provide data security, certain conventional systems may store and manage print data and print log information that are associated with each other, in order to allow for tracing of a path of leakage of confidential information that is printed by an unauthorized user for a falsified purpose or by an authorized user by mistake. Here, examples of the "print log information" may include various information such as a user name, a client personal computer (PC) name, a print document name, and a date and time of printing.

In such a conventional system, if an information leakage is detected, the system searches its storage area for print data similar to the leaked text data or image data and refers to print log information about the print data extracted as a result of the search that is highly similar to the leaked information. Such a system may be referred to as a "document management system".

The above-described system may include a document management client unit and a document management server unit. The document management client unit operates on a printer while the document management server unit operates on a general-purpose PC or a server apparatus (a server-dedicated computer). In such a system, the document management client unit and the document management server unit may be in communication with each other via a network.

The document management client unit acquires print data for a document to be printed that has been sent from a client PC to the printer and sends the acquired print data to the document management server unit together with the print log information.

Then, the document management server unit divides the received print data in the unit of a page, then divides each page into text areas and image areas to generate search data for each area. After that, the document management server unit mutually associates and integrates the print data for one page, text area information, image area information, text area search data, and image area search data to generate storage data for each page.

Furthermore, the document management server unit mutually associates and integrates original print data and the page-by-page storage data for each page to generate storage data for each print data. Then, the document management server unit stores the generated storage data for each print data in a storage unit.

Japanese Patent Application Laid-Open No. 2006-081119 discusses a method for recording link information that is linked with the stored print data, in print log information in the case of reprinting a print document that has been already printed and whose print data already exists in a document management system, instead of storing the same print data again in the document management system.

Moreover, in a company that operates nationwide or worldwide, it is usual that several tens or several thousands of business sites are established throughout Japan or the world and a PC is provided for each employee while a printer is provided to a few of or several tens of employees working at each such business site.

Under such circumstances, the market has desired a method for preventing an information leakage by introducing the document management system as described above. The document management system may be installed at the headquarters or the home office and typically includes one document management server that stores and manages print data sent from a PC of each individual employee to the printer installed at the business site. In this case, an estimated amount of print data to be stored on the document management server is several hundreds of gigabytes per day (=several thousands of employees×several pages per day (several hundreds of kilobytes per page)).

An ordinary storage device may not be able to entirely and routinely store such a large amount of data. Accordingly, it may be necessary to introduce a storage device that can utilize storage modules provided in the document management system in a decentralized manner by using a network function. However, high costs may be required to manufacture such a storage device. Thus, an environment that can reduce the amount of data to be stored has been desired by the market.

Meanwhile, various types of application software such as general spreadsheet application software have been widely used, which, in the case of printing a plurality of copies of a print document, may send the same print data for each of the designated number of copies. Application software like this may not efficiently use and may even excessively consume data storage area of a document management server by causing the document management server to repeatedly store the same data over and over again.

While a need remains for improved document management, the installation of a server at each business site may be is generally avoided or even prohibited to reduce initial costs and operation costs that may possibly arise at each such site (i.e., a division-serverless system).

Moreover, in the case of using the document management server unit, a load in receiving data and storing the received data is may be very high. Accordingly, there remains a need in the market for a system or a method for reducing the amount of processing to a minimum. Japanese Patent Application Laid-Open No. 2006-081119 discusses one example of an improved method.

Furthermore, a conventional method under development collates a hash value for the entire print document and a hash value for each page to identify an updated page of the print document as a difference and stores only the updated page as print data together with print log information.

However, the above-described conventional method or the method under development may not be capable of sufficiently reducing operation costs (e.g., may not be able to sufficiently reduce the data storage area consumption amount) in the following case.

That is, in the case of printing a document in which only a specific field of a page (a "company name" field, for example) is different from that of another similar document, the document is registered as a different document or the page of the document including the different content is stored as an updated page on the document management server. Accordingly, in certain circumstances, the consumption of the capacity of storage area may not be adequately reduced.

Similar issues may also arise in a form printing system that dynamically inserts data at the time of printing into a predetermined template (form) that includes only a ruled line or a stationary graphic (a logo or the like).

SUMMARY OF THE INVENTION

In one aspect, the present invention is directed to a form management system capable of identifying form data if different form data is overlaid on a form template during processing for generating a form.

In one embodiment, the present invention is directed to a form management system capable of generating a form identification (ID) for a form to be generated based on a template ID, which is generated based on a form template, and a form data ID which is generated based on form data to be overlaid, and also capable of identifying and managing the form template and the form data for the form to be generated.

According to an aspect of the present invention, a form management system includes a form generation apparatus that includes a template identification (ID) generation unit configured to generate a unique template ID at the time of generating a form template, a template ID embedding unit configured to embed the template ID generated by the template ID generation unit in the generated form template, a form data ID calculation unit configured to calculate a form data ID based on form data at the time of overlaying the form data on the form template and generating the form. The form generation apparatus also includes a form ID generation unit configured to generate a form ID based on the template ID generated by the template ID generation unit and the form data ID calculated by the form data ID calculation unit, and a form ID embedding unit configured to embed the form ID generated by the form ID generation unit in the generated form. The form management system further includes a tracking data storage database that includes a storage unit configured to receive a template corresponding to the form template from the form generation apparatus and store the received template as a part of tracking data.

According to another aspect of the present invention, a form management system includes a form generation apparatus that includes a print instruction unit configured to issue an instruction to a printing apparatus for printing out a form generated by overlaying form data on a form template, in which the form template includes a template ID, the form data includes a form data ID, and the form includes a form ID that is generated based on the template ID and the form data ID. The printing apparatus includes a printing and outputting unit configured to print out the form according to the print instruction from the form generation apparatus, and a tracking data sending unit configured to send tracking data to a tracking data storage database at the time the printing and outputting unit prints out the form, in which the tracking data includes the form ID and data for printing out the form. The tracking data storage database includes a storage unit configured to store the tracking data, an extraction unit configured to extract a template ID from the form ID included in the tracking data received from the tracking data sending unit, and a determination unit configured to determine whether the template ID extracted by the extraction unit is stored in the storage unit. The tracking data storage database associates the received tracking data with the template ID and stores the tracking data in the storage unit if it is determined by the determination unit that the template ID has been stored in the storage unit. If it is determined by the determination unit that the template ID has not been stored in the storage unit, then the tracking data storage database newly stores the template ID in the storage unit while associating the tracking data with the template ID and storing the tracking data in the storage unit.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the present invention.

FIG. 8B illustrates an example of processing for calculating a form data ID according to an exemplary embodiment of the present invention.

DETAILED DESCRIPTION OF THE EMBODIMENTS

Various exemplary embodiments, features, and aspects of the present invention will now be herein described in detail below with reference to the drawings. It is to be noted that the relative arrangement of the components, the numerical expressions, and numerical values set forth in these embodiments are not intended to limit the scope of the present invention.

Figure 1:
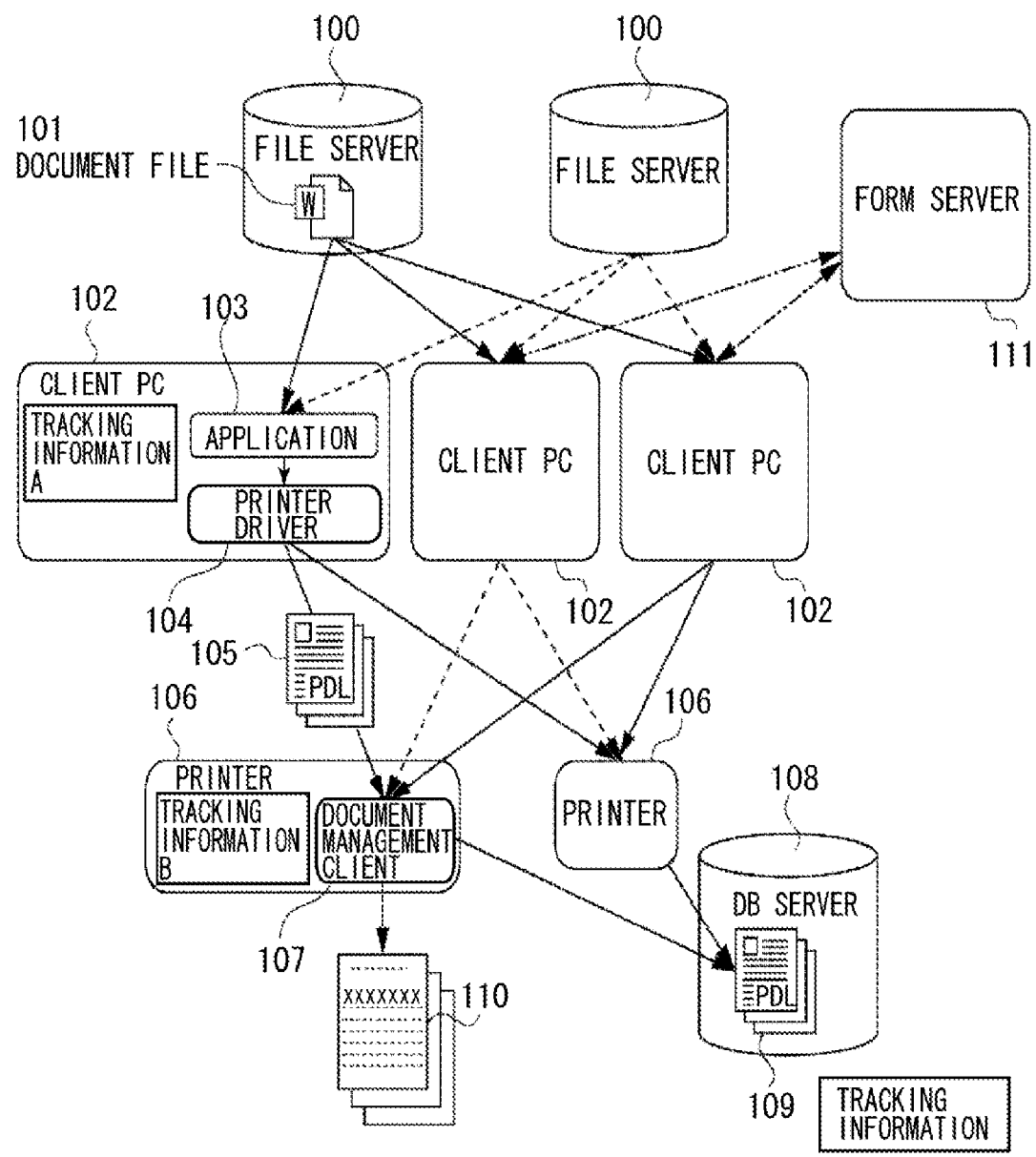
FIG. 1 illustrates an example of a configuration of a print management system according to an exemplary embodiment of the present invention.

An exemplary embodiment of the present invention is described below. FIG. 1 illustrates an example of a configuration of a print management system according to the exemplary embodiment.

In the example illustrated in FIG. 1, the print management system includes a plurality of file servers, a plurality of client PCs, a plurality of printers, and a database (DB) server, which are in communication with one another via a network. However, the present exemplary embodiment is not limited to this configuration and an arbitrary number of file servers, client PCs, or printers can be used in configuring the system.

Referring to the embodiment illustrated in FIG. 1, the print management system includes a file server 100. In the present exemplary embodiment, it is supposed that a hard disk drive (HDD) that has been formatted with New Technology File System Version 5 (NTFS v5), which is a file system for Windows 2000® of Microsoft Corporation, for example, is available to users on the network as a shared folder. An electronic document file 101 may be stored on the file server 100.

Furthermore, the print management system includes a client PC 102. The client PC 102 and the file server 100 may belong to the same domain.

A form server 111 receives a request from the client PC 102, generates a form thereon based on the request, and transfers the generated form data to the client PC 102.

An application 103 operates on the client PC 102. The application 103 can open, edit, display, and print the electronic document file 101.

A printer driver 104 translates a general-purpose drawing command into a drawing command that can be interpreted by and unique to a printer (a multifunction peripheral (MFP)) 106 according to a print request from the application 103 to generate print data 105. The print data is page description language (PDL) data such as printer control language (PCL) and PostScript (PS).

Furthermore, the print data 105 may include data for a plurality of pages. The data size of the print data 105 may range, for example, from about several hundreds of kilobytes to several megabytes in the case of printing print data for an A4-sized document.

Furthermore, the print management system includes the printer (MFP) 106. The printer (MFP) 106 may be installed with a built-in Java virtual machine (Java 2 Micro Edition: hereinafter simply referred to as "J2ME"). Thus, the printer (MFP) 106 can execute a small-sized application that has been generated by, for example, J2ME.

A Java application 107 may be an application generated by J2ME. The Java application 107 is referred to as a "document management client" herein. The document management client 107 sends print data and tracking information (print log information) for tracing the print data to a database (DB) server 108. The DB server 108 functions as a document management server.

In the example illustrated in FIG. 1, the DB server 108 collectively stands for the DB server itself and a storage area thereof. The DB server 108 processes the print data received from the document management client 107 so that the print data can be easier to search. The DB server 108 integrates the print data, searching data for the print data, and the print log information (the tracking information) and stores the integrated data and information as management information (primary data) 109 on the database (DB).

A print product 110 is a product that is actually printed by the printer 106.

As described above, in the embodiment of the print management system illustrated in FIG. 1, the printer 106 and the client PC 102 are in communication with each other via a predetermined network (e.g., a local area network (LAN)). Thus, the printer 106 and the client PC 102 can perform data communication with each other. Accordingly, in the first exemplary embodiment, the print data (various page description language (PDL) data such as PDF or PS) can be output to the printer 106 via the network to print the print data with the printer 106.

Furthermore, it is not always necessary to connect the printer 106 with the client PC 102 via the network. Instead, the printer 106 can be directly connected with the client PC 102 via a predetermined interface (e.g., an interface such as a universal serial bus (USB) interface).

Now, an embodiment of a function of the MFP, which is an example of the printer 106, will be described below.

The printer (MFP) 106 may include a storage device such as a hard disk capable of storing a plurality of jobs therein. Further, the printer (MFP) 106 may include a copy function for printing a job input from a scanner unit with a printer unit via the storage device.

Furthermore, the printer (MFP) 106 may include a print function for printing a job input from an external apparatus such as a PC with the printer unit via a storage device.

Moreover, the printer (MFP) 106 may include a sending function for sending a job input from the scanner unit to an external apparatus on the network by an e-mail or a facsimile. Furthermore, the printer (MFP) 106 can include an environment for executing the above-described Java application 107.

As described above, the printer (MFP) 106 includes a plurality of functions and can execute the functions in combination with one another.

The printer 106 is furthermore not limited to an MFP. A printing apparatus using other print methods such as a laser beam printer or an inkjet printer can also be used as the printer 106.

While in one version the MFP includes a full-color printing apparatus and a monochromatic printing apparatus, either a full-color printing apparatus or a monochromatic printing apparatus can be used as the MFP.

Furthermore, in one version, the system according to the exemplary embodiment of the present invention can include both a multifunctional image forming apparatus (printing apparatus) having a plurality of functions and a single-function image forming apparatus (printing apparatus) having a print function only. In yet another version, the system according to the exemplary embodiment of the present invention includes either one of a multifunctional image forming apparatus (printing apparatus) having a plurality of functions and a single-function image forming apparatus (printing apparatus) having a print function only. In other words, any type of image forming apparatus having any configuration that is capable of implementing the present invention can be used as the system according to the exemplary embodiment of the present invention.

Now, an embodiment of an inner configuration of the printer 106 will be described below with reference to FIG. 2.

Figure 2:
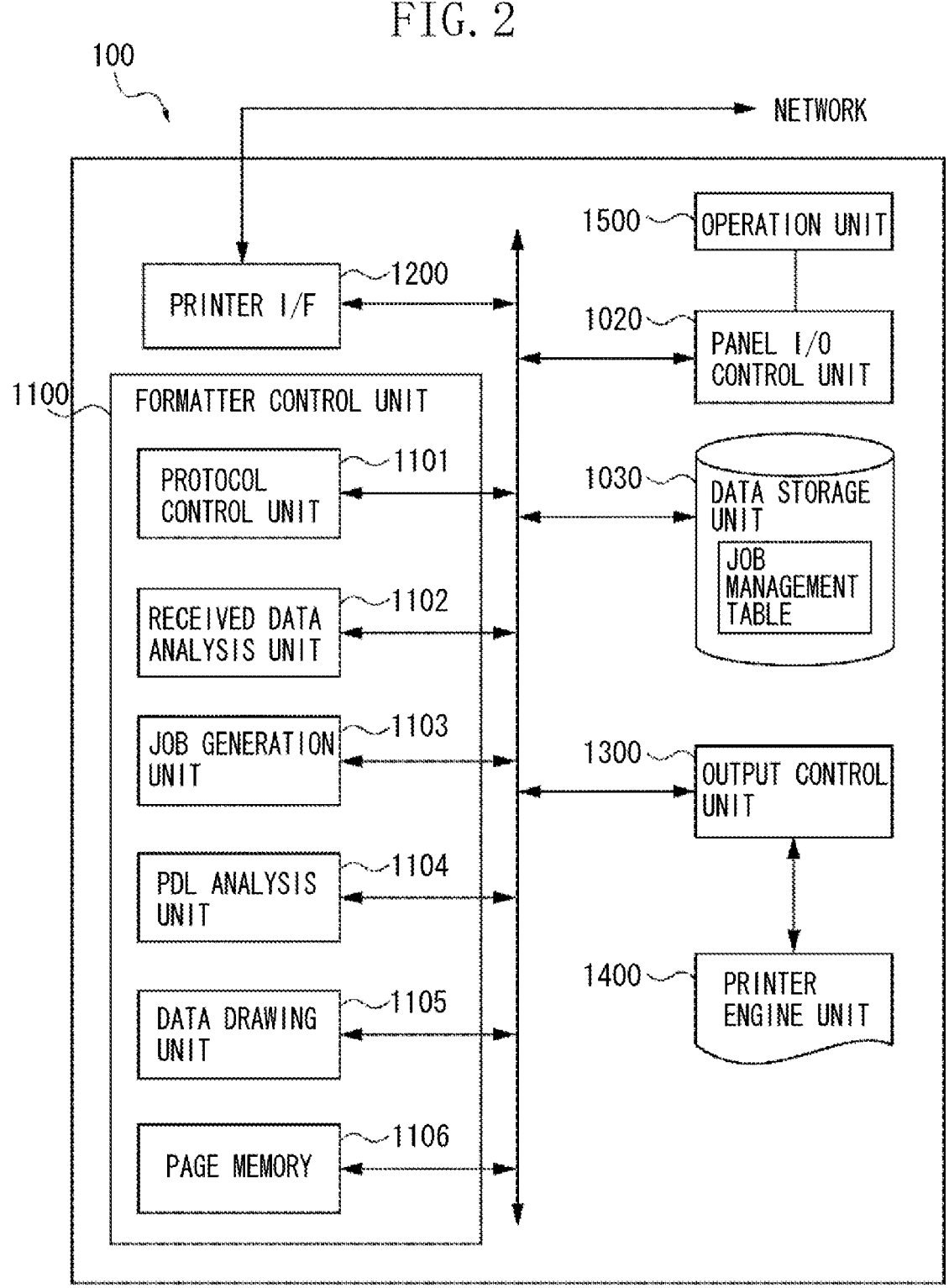
FIG. 2 illustrates an example of main components of a printer according to an exemplary embodiment of the present invention.

FIG. 2 illustrates an example of a primary inner configuration of a printer in the print management system according to one version of the present exemplary embodiment.

Referring to FIG. 2, the printer 106 includes a formatter control unit 1100, a panel input and output (I/O) control unit 1020, a data storage unit 1030, a printer interface (I/F) 1200, an output control unit 1300, and a printer engine unit 1400.

The printer I/F 1200 controls an input and output between the print management system and an external apparatus. The formatter control unit 1100 includes a protocol control unit 1101, a received data analysis unit 1102, a job generation unit 1103, a PDL analysis unit 1104, a data drawing unit 1105, and a page memory 1106.

The formatter control unit 1100 generally includes a computer system having a central processing unit (CPU), a read-only memory (ROM), and a random access memory (RAM). Further, the function of the program for implementing various types of applications including the document management client 107 (FIG. 1) is stored on the ROM of the formatter control unit 1100 and is loaded to be executed by the CPU.

In the formatter control unit 1100, the protocol control unit 1101 performs a communication with an external apparatus on the network by analyzing a network protocol and sending the analyzed network protocol. The received data analysis unit 1102 analyzes data received from the client PC 102 to recognize print setting information that has been set by a user and a content of processing to be performed based on the received data.

Furthermore, the received data analysis unit 1102 performs processing (processing illustrated in FIG. 9), which will be described in detail below, on the received data and sends data that may be required to the DB server 108.

The job generation unit 1103 generates a print job corresponding to the received data that is to be processed. Then, the generated job is temporarily stored on the data storage unit 1030. The panel I/O control unit 1020 can output an operation screen that displays information about a status of a job on an operation unit 1500 of the printer 106.

The PDL analysis unit 1104 analyzes PDL data based on a job stored on the data storage unit 1030 to convert the analyzed PDL data into intermediate data, which is a data format that may be more suitable to the processing. The intermediate data generated by the PDL analysis unit 1104 is then sent to the data drawing unit 1105 and processed.

The data drawing unit 1105 rasterizes the intermediate data into bitmap data. The rasterized bitmap data is sequentially drawn on the page memory 1106.

The panel I/O control unit 1020 controls an input and output of data to and from the operation unit 1500 of the printer 106. The data storage unit 1030 stores the received data and the intermediate data for PDL printing. In one version, the data storage unit 1030 can be implemented by a secondary storage device such as a hard disk.

Furthermore, the data storage unit 1030 stores various types of data, a job to be printed, and a printed job. In addition, the data storage unit 1030 includes a job management table for managing a job to be printed and the printed job.

The output control unit 1300 converts data stored on the page memory 1106 into an image signal. The output control unit 1300 then transfers the image generated by the conversion processing to the printer engine unit 1400. The printer engine unit 1400 is a printing mechanism that forms an image based on the image signal received from the output control unit 1300 on a recording paper as a permanent visible image.

Now, an exemplary configuration of the file server 100, the client PC 102, and the DB server 108, which are implemented by an information processing apparatus such as a computer, will be described in detail below with reference to FIG. 3.

Figure 3:
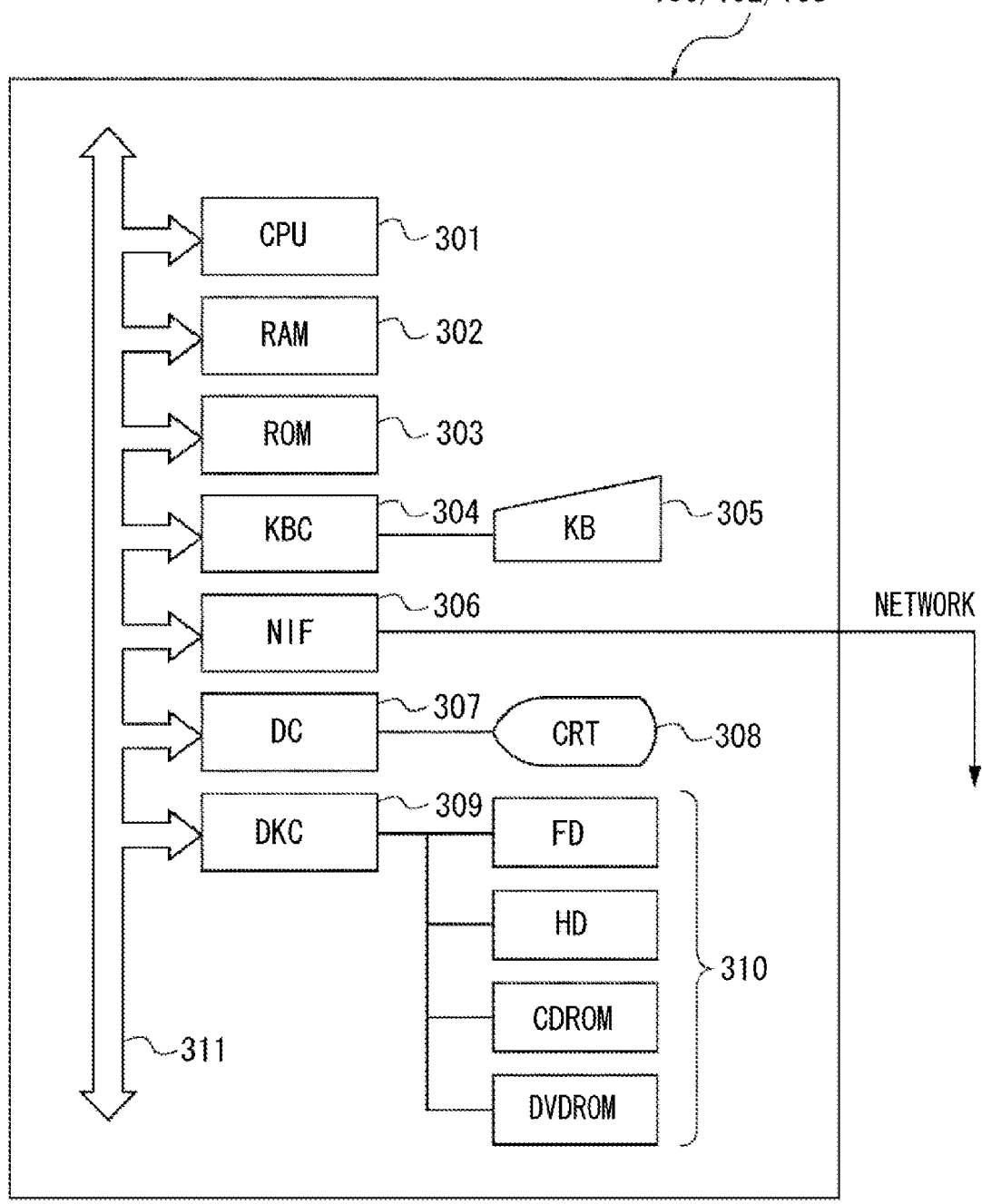
FIG. 3 illustrates an example of a configuration of an information processing apparatus according to an exemplary embodiment of the present invention.

FIG. 3 illustrates an example of a configuration of an information processing apparatus of the print management system according to an exemplary embodiment.

Referring to FIG. 3, a CPU 301 controls the entire information processing apparatus and calculation processing. The CPU 301 loads and executes on a RAM 302 a program and data used in each processing. A ROM 303 is a storage area that stores a system control program and font data.

A keyboard control unit (a keyboard controller: KBC) 304 receives data input by a user operating an input device such as a keyboard (KB) 305 and sends the input data to the CPU 301.

The information processing apparatus communicates via a network interface (NIF) 306 with an external apparatus on the network.

A display control unit (display controller: DC) 307 controls display on a display apparatus (a cathode ray tube (CRT)) 308. A disk control unit (a disk controller: DKC) 309 controls the transmission of data.

An external storage device 310 may be at least one of a floppy disk drive (FD), an HDD, a compact disc (a compact disk-read only memory (CD-ROM)), and a digital versatile disk (DVD) (a DVD-read only memory (DVD-ROM)). The external storage device 310 stores an application, various types of programs such as the printer driver, and data. The program and the data stored on the external storage device 310 may be referred to or loaded on the RAM 302 during processing as they become necessary. A system bus 311 is a path for sending and receiving data among the above-described units.

The external storage device 310 stores the printer driver, which displays a print setting screen. The user controls the printer 106 to perform printing and makes various print settings for the print data output to the printer 106 via the print setting screen.

The information processing apparatus starts to operate when the CPU 301 executes a basic I/O program and an operating system (OS).

The basic I/O program is stored on the ROM 303, while the OS is written and stored on the external storage device 310.

When the client PC 102 is powered on, the CPU 301 loads the OS from the external storage device 310 onto the RAM 302 using an initial program loading (IPL) function in the basic I/O program to start the operation of the OS. Further, the user can perform various settings via the print setting screen displayed by the printer driver when generating an instruction for starting print processing.

Figure 4:
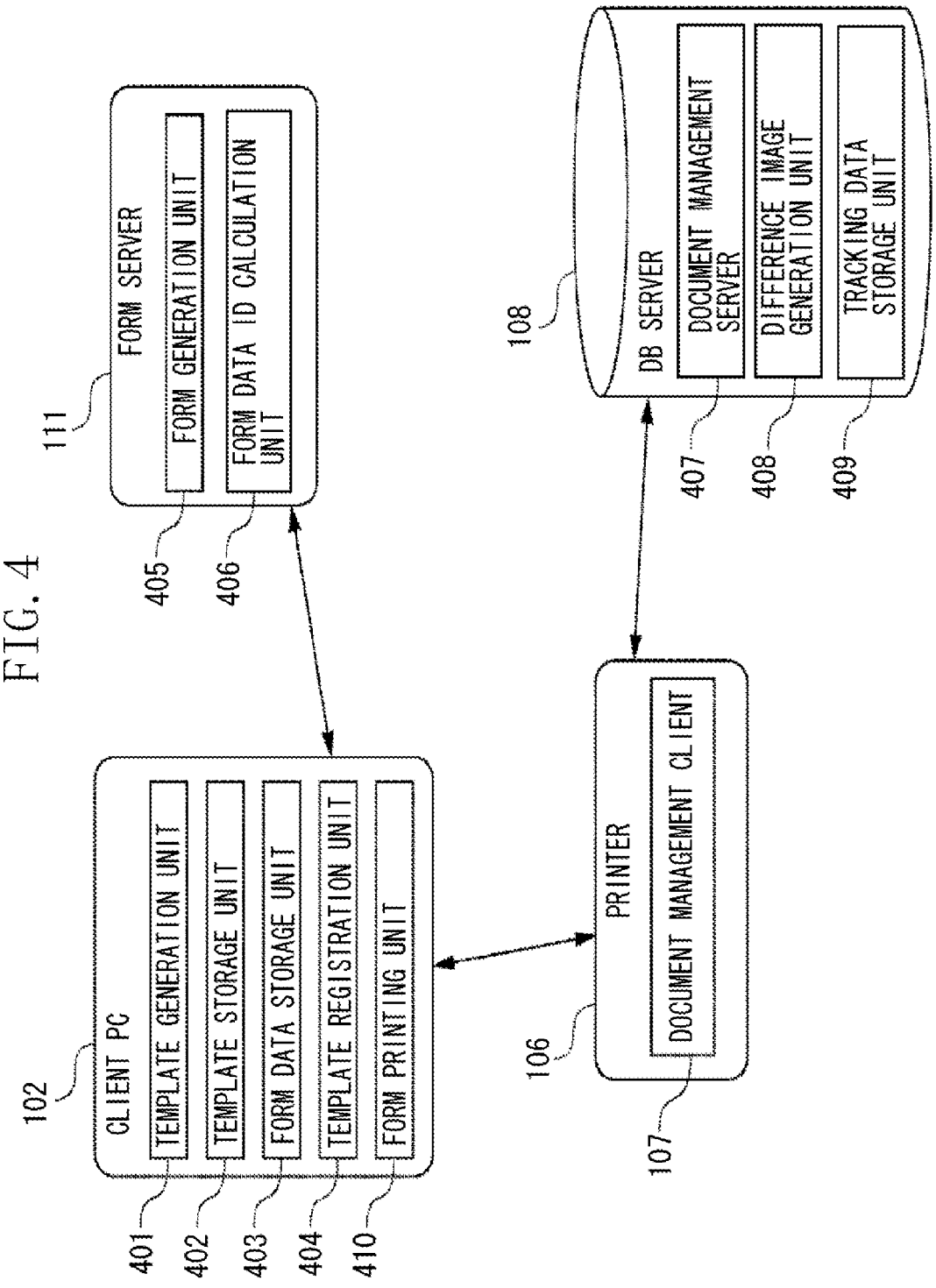
FIG. 4 illustrates an exemplary functional configuration of the print management system according to an exemplary embodiment of the present invention.

FIG. 4 illustrates an exemplary functional configuration of the program executed by the system according to an exemplary embodiment.

The program according to the exemplary embodiment includes a template generation unit 401, a template storage unit 402, a form data storage unit 403, a template registration unit 404, and a form printing unit 410, which may be provided within the client PC 102.

In addition, the program according to the exemplary embodiment can include a form generation unit 405 and a form data ID calculation unit 406, which are provided within the form server 111. Moreover, the program according to the exemplary embodiment includes the document management client 107 within the printer 106.

In addition, the program according to the exemplary embodiment can include, a document management server 407, a difference image generation unit 408, and the tracking data storage unit 409, which are provided within the DB server 108.

In one exemplary embodiment, the above-described processing units 401 through 406, 408 through 410, and the document management server 407 are provided in a dispersed manner within the client PC 102, the form server 111, and the DB server 108. However, embodiments of the invention are not limited to this configuration. For example, the above-described processing units, can also operate on the same machine or apparatus, as long as processing according to embodiments of the invention can be performed.

Each function may be executed as a program module on the information processing apparatus such as the client PC 102, the DB server 108, and the form server 111. Furthermore, the document management client 107 may be executed on the printer 106 in a Java environment. Examples of the operation performed by each processing module (processing unit) will be described in detail below.

Aspects of the present invention relate to processing for generating a form template, processing for generating a form (e.g., processing for dynamically inserting data into a template, which hereinafter will be simply referred to as "overlay processing"), and processing for printing the form. An example of a flow of each processing will be described in detail below.

Figure 5:
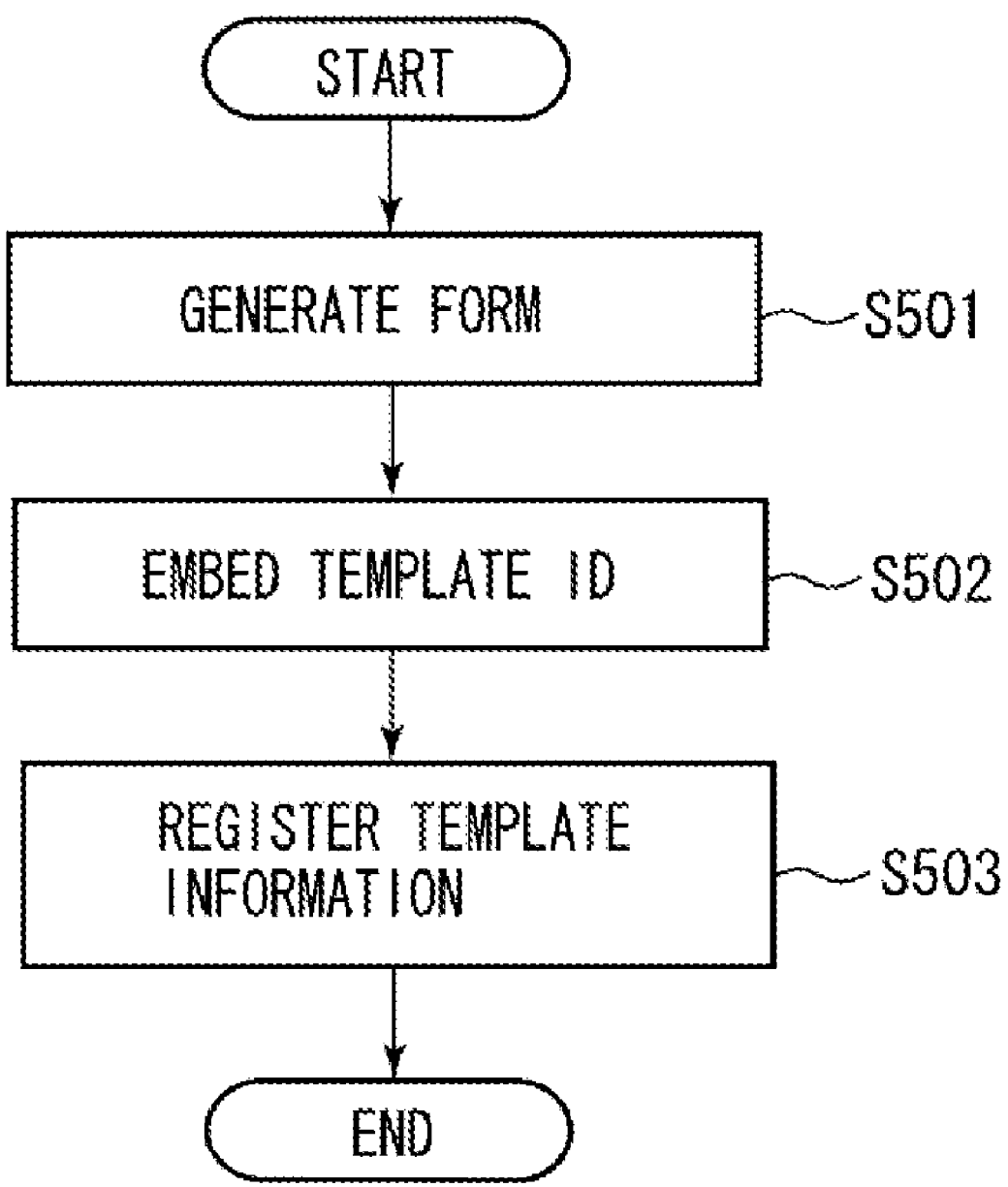
FIG. 5 illustrates an example of a flow of processing for generating a form template according to an exemplary embodiment of the present invention.

FIG. 5 illustrates an exemplary flow of processing for generating a form template according to an exemplary embodiment.

Referring to FIG. 5, in step S501, the template generation unit 401 generates a form template according to an instruction from the user. For example, in step S501, the template generation unit 401 may generate a table using a ruled line drawing tool and arranges an image of a logo that has been generated as a bitmap (BMP) image. It may be suitable to use a well-known method for generating the template.

In step S502, the template generation unit 401 embeds a template ID in the form template generated in step S501. With respect to timing for embedding the template ID, in one version the user can explicitly designate the timing for embedding the template ID (such as in the case where the user selects "save" from a menu, for example). In another version, it may also be useful if the template generation unit 401 automatically determines the timing for embedding the template ID on a backend apparatus (the print management system).

In the case of automatically determining the timing for embedding the template ID, the template generation unit 401 can perform processing for storing the print setting at a predetermined time interval (e.g., ten minutes) while the user is editing the template. Thus, the template ID becomes embedded.

With respect to a method for generating a template ID to be embedded, in one version a template ID can be generated based on the template generated according to a well-known method, such as by using a hash algorithm as described above. Alternatively, a template ID issued by a form system can be added to the template so that an ID is unique in the form system. The above is the method for generating a template ID.

In step S503, the template information registration unit 404 performs processing for registering information about the form template generated in steps S501 and S502 on the document management server 407.

It may usually be the case that, together with a job log (print log information) to be registered on the document management server 407, the extracted text data, and the image data, the form ID is registered being linked therewith.

Figure 6:
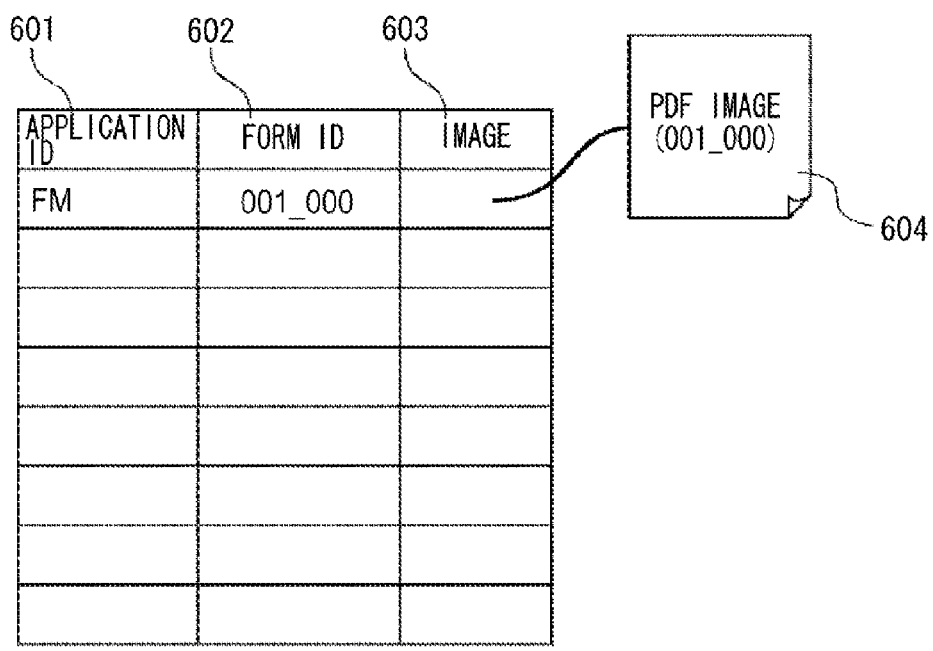
FIG. 6 illustrates an example of information about a form template stored in a database (DB) server according to an exemplary embodiment of the present invention.

FIG. 6 illustrates an example of information about the form template stored in the tracking data storage unit 409, which may be managed by the document management server 407 in step S503, as a table.

The application ID is held in a column 601 of the table. The application ID is embedded in the form together with the form ID and indicates the application that has printed the form.

By referring to the application ID, it can be determined whether a series of operation flows according to the present exemplary embodiment can be performed (whether the form ID has been embedded with a predetermined format). However, the determination as to whether a series of operation flows according to the present exemplary embodiment can be performed may, in certain circumstances, be made by referring only to the form ID itself. Therefore, it may not be necessary to embed an application ID.

A column 602 holds the form ID. The form ID is embedded in each page of a printed form. The processing for embedding the form ID is as described above.

In one version of registering a template image, a predetermined specific ID is held in the column 602, as will be described in detail below. A column 603 holds the image data for the form.

In step S503, image data 604 and a form ID "001_000" may be linked with each other and registered as illustrated in FIG. 6. In one exemplary embodiment, a document ID to be registered being linked with a template image is generated by adding a bar and numerical figures "_000" to the template ID. However, a character string different from "_000" can also be used. Accordingly, in the example illustrated in FIG. 6, the template ID is "001".

Furthermore, any format for storing data can be used if the template can be indicated based on which registered image data has been generated. In one version, the format for storing data is, for example, PDF, Joint Photographic Experts Group (JPEG), or BMP.

In the example illustrated in FIG. 6, the form ID "001_000" corresponds to an application ID "FM" and, it is linked with the image data 604. The method for generating a form ID is as described above.

In one exemplary embodiment, the form ID is provided separately from the application ID. However, it may also be useful if a form ID is generated so that an application ID includes the form ID.

Figure 7:
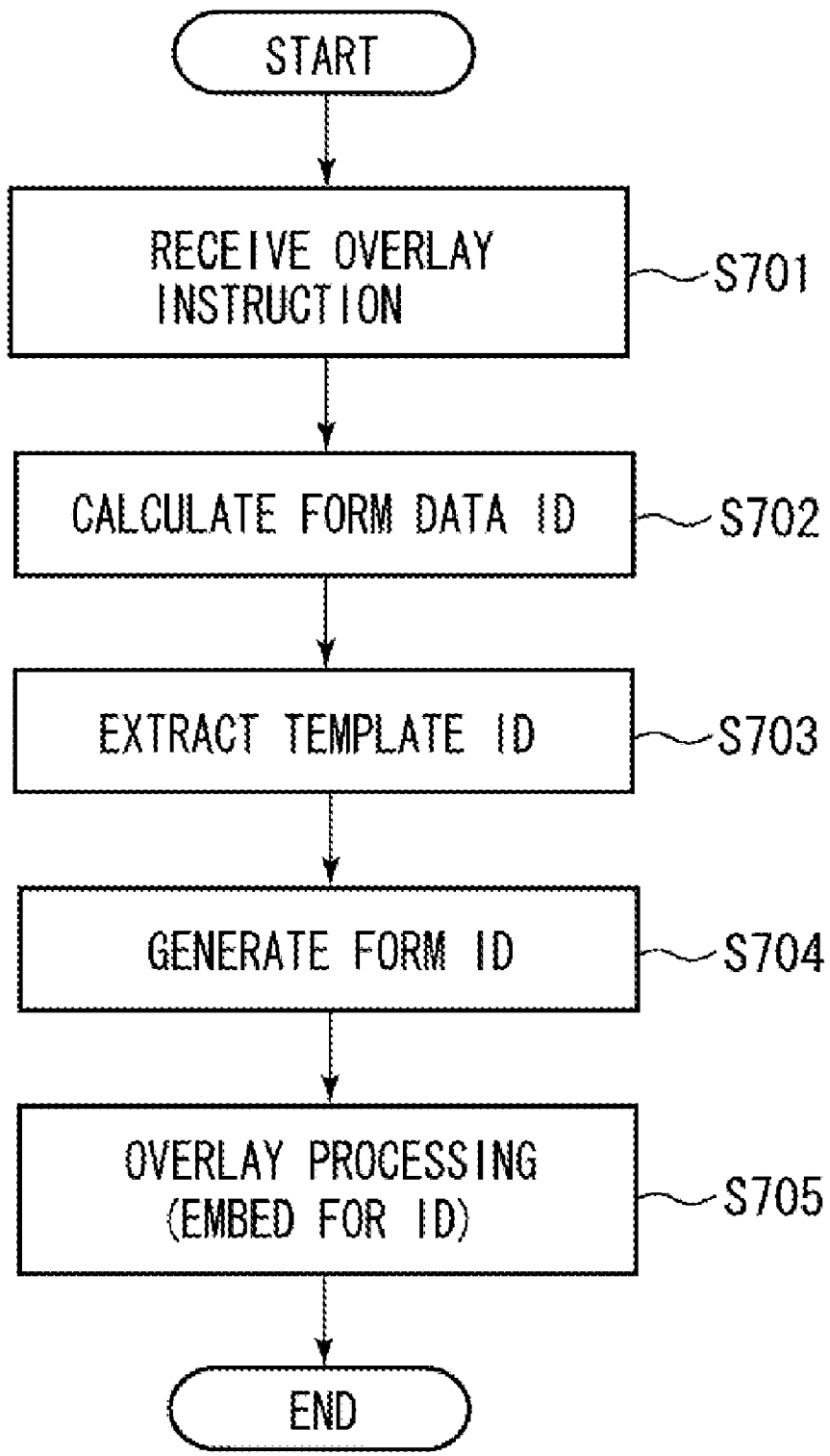
FIG. 7 illustrates an example of a flow of processing for generating a form (overlaying processing) according to an exemplary embodiment of the present invention.

FIG. 7 illustrates an example of a flow of processing for dynamically inserting data in the form template, namely, processing for generating the form (overlaying processing) according to an exemplary embodiment.

Referring to FIG. 7, in step S701, the form generation unit 405 receives an overlay instruction from the user. Here, the user may designate the form template and the form data used in the overlaying processing.

In step S702, the form data ID calculation unit 406 calculates the form data ID for the form data designated by the user in step S701.

Figure 8A:
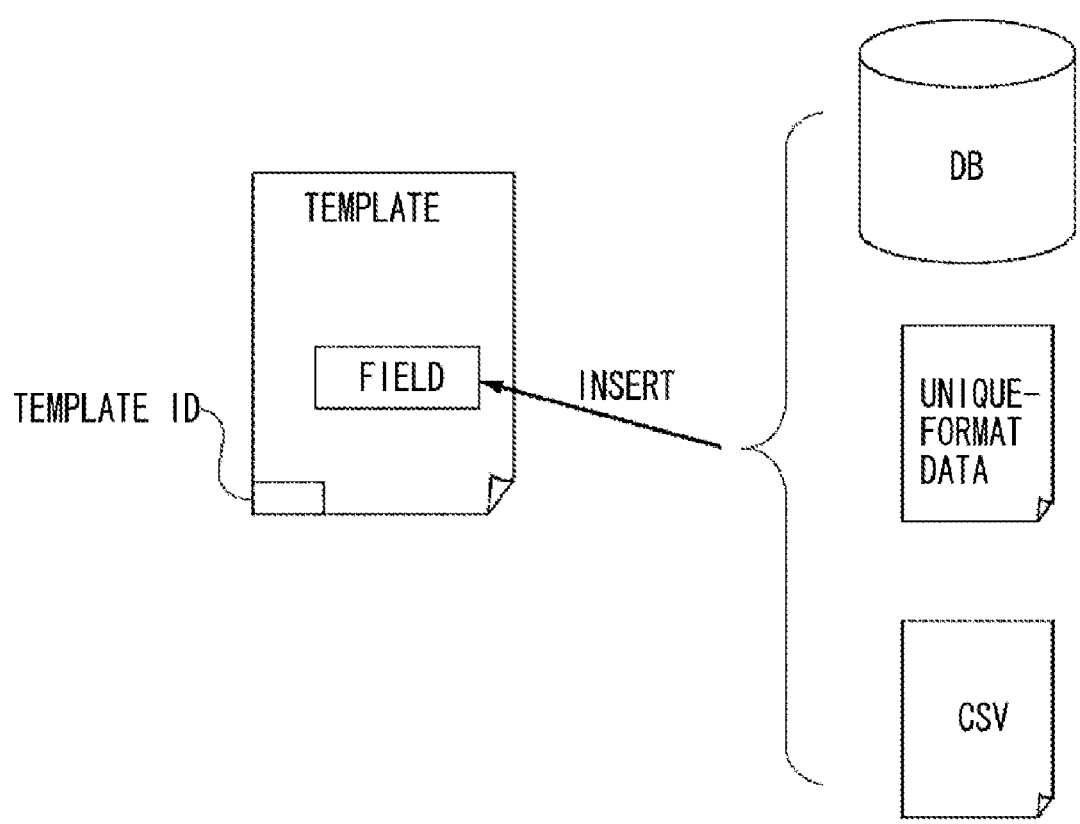
FIG. 8A illustrates an example of processing for calculating a form data ID according to an exemplary embodiment of the present invention.

Each of FIGS. 8A and 8B illustrates an outline of the processing for calculating the form data ID according to the present exemplary embodiment.

As illustrated in FIG. 8A, various formats of data can typically be inserted into the template. For example, the data to be inserted in the template can include data in a format unique to each form system such as a database or a comma separated value (CSV) file.

In the case where data having the same format is inserted in the template, the same print images may be generated even if the data formats are different. The form data ID calculation unit 406 issues an ID, considering the difference in the data format.

For example, a pair of an identifier (hereinafter simply referred to as a "field name") of the field into which data is inserted and the data itself, may be stored on the memory corresponding to one page, as illustrated in FIG. 8B. For example, the ID can be calculated by using a hash algorithm based on the stored data. The form data ID calculation unit 406 sends the calculated form data ID to the form generation unit 405.

In step S703, the form generation unit 405 performs processing for acquiring the template ID from the designated form template. The form generation unit 405, which may be familiar with the format for the form template, may readily acquire the template ID.

In step S704, the form generation unit 405 generates a form ID based on the template ID acquired in step S703 and the form data ID sent from the form data ID calculation unit 406 in step S702.

In one exemplary embodiment, in the case where the template ID is "001" and the form data ID is "00A", the form generation unit 405 generates a form ID "001_00A", in which an under score is used to connect the template ID and the form data ID. However, any other format of the form ID may be usable if the template ID portion can be identified from the form ID.

In step S705, the form generation unit 405 performs the form overlaying processing and the processing for embedding the form ID generated in step S704 in the form.

Figure 9:
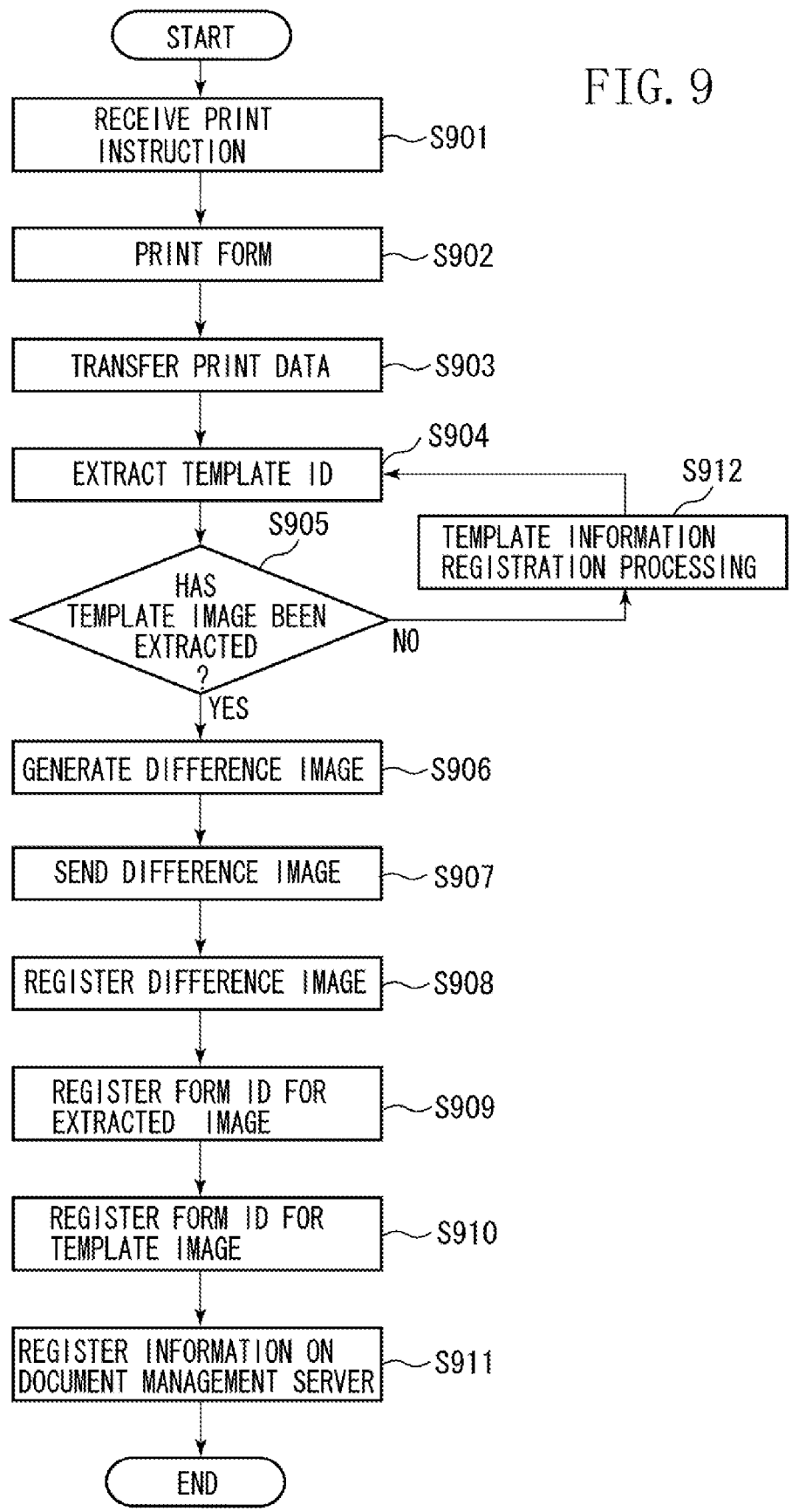
FIG. 9 illustrates an example of a flow of processing for printing a form according to an exemplary embodiment of the present invention.

FIG. 9 illustrates an example of an operation flow of processing for printing the form according to an exemplary embodiment.

Referring to FIG. 9, in step S901, the form printing unit 410 receives an instruction for printing the form generated in step S705 according to the designation by the user.

In step S902, the form printing unit 410 instructs the printer 106 to print the form.

In step S903, the document management client 107, which operates on the printer 106, extracts data to be registered on the document management server 407 (data such as text data, image data, or the like) from the print job for printing the form and transfers the extracted data to the document management server 407. At this time, the form ID embedded in the form is transferred to the document management server 407 together with the data to be registered on the document management server 407.

In step S904, the document management server 407 extracts the template ID portion of the form ID that has been sent from the document management client 107.

In step S905, the document management server 407 searches the tracking data storage unit 409 for information that the document management server 407 itself manages. Then, the document management server 407 determines whether a form ID exists whose template ID portion matches the template ID extracted in step S904 and the other form data ID portion thereof is "000".

If it is determined in step S905 that a form ID exists whose template ID portion matches the extracted template ID (YES in step S905), then the processing advances to step S906. In step S906, the difference image generation unit 408 generates a difference image between the image data transferred to the document management server 407 in step S903 and the image data (the template image) that is linked with the form ID whose template ID portion matches the template ID extracted in step S904 and the other form data ID portion thereof may be "000" in step S905.

In step S907, the difference image generation unit 408 sends the difference image generated in step S906 to the document management server 407.

In step S908, the document management server 407 stores the difference image, which has been sent from the difference image generation unit 408 in step S907 in the tracking data storage unit 409.

In step S909, the document management server 407 links the form ID that has been sent from the document management client 107 in step S903 with the difference image data stored in step S908 and stores the form ID and the difference image data linked with each other in the tracking data storage unit 409.

In step S910, the document management server 407 links the form ID of the template image extracted as a result of the determination processing in step S905 with the difference image data stored in step S908 and stores the form ID and the difference image data linked with each other in the tracking data storage unit 409.

In step S911, the document management server 407 stores the data that may be usually stored in the document management server such as the job log which has been sent from the document management client 107 in step S903 or the extracted text data.

In the exemplary embodiment, it may be ensured that the template image linked with the form ID whose template ID portion matches the template ID extracted in step S904 is registered on the document management server 407 by the processing for registering the template information in step S503 (FIG. 5).

Accordingly, if it is determined in step S905 that no form ID exists whose template ID portion matches the extracted template ID (NO in step S905), although this case is unlikely in the present exemplary embodiment, then the processing advances to step S912. In this case, it may be useful to register the template information again in step S912. More specifically, it may be useful to invoke the template information registration processing in step S503 (FIG. 5) to register the template information again and to return to and perform again the processing in step S904 for extracting the template ID and beyond.

Figure 10:
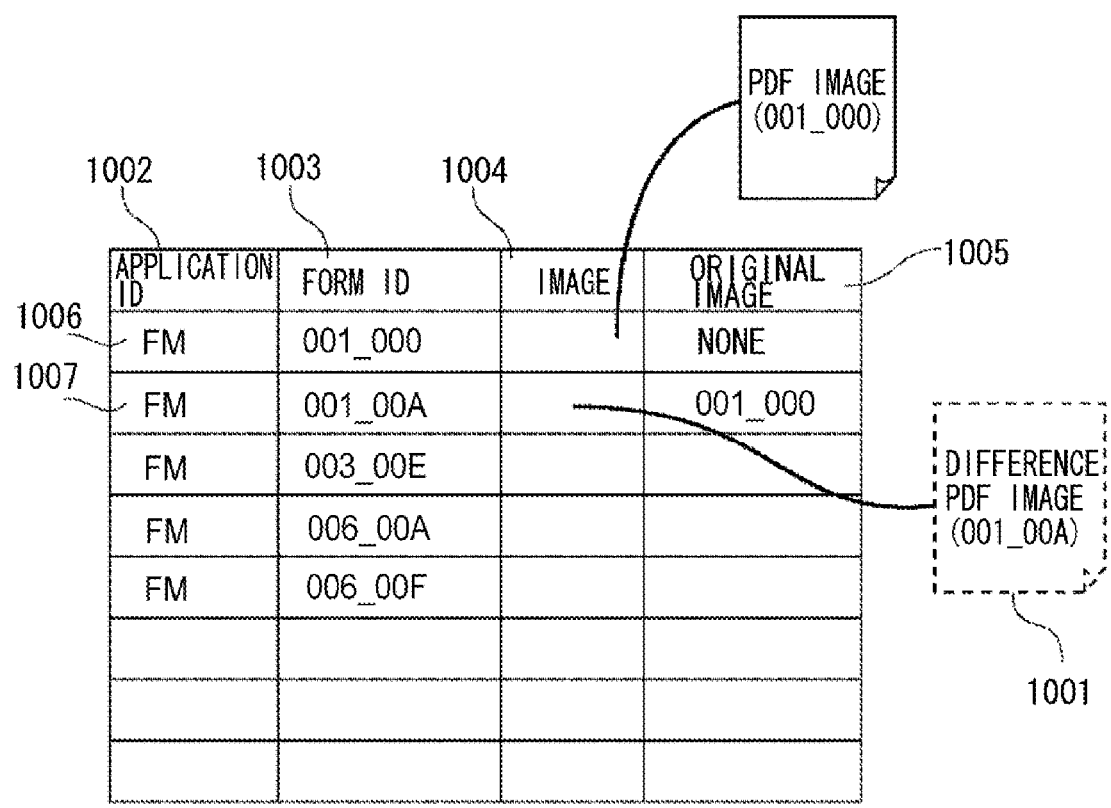
FIG. 10 illustrates an example of tracking information stored on the DB server according to an exemplary embodiment of the present invention.

FIG. 10 illustrates an example of a state of the tracking data storage unit 409 that may be managed by the document management server 407 after having performed the processing for printing the form illustrated in FIG. 9 according to the one exemplary embodiment, illustrated as a table in a pseudo manner. Note here that a column 1002 and a column 1003 are similar to the application ID column 601 and the form ID column 602 illustrated in FIG. 6, respectively. Accordingly, the description thereof will not be repeated here.

Referring to FIG. 10, the image data for the form may be held in a column 1004. A row 1006 is a column in which the template may be entered and registered. Accordingly, the image for the form template itself may be held in the column 1004.

A row 1007 is a column in which the form is entered and registered. Accordingly, the difference image is held in the column 1004. The form ID for the template image is held in a column 1005.

In one version, the form ID for the template image may be held and stored in the column 1005 only when the user registers the difference image in the column 1004.

As described above, a difference image 1001, which has been stored in the document management server 407 in step S908, is stored and linked with the form ID held in the column 1003 in step S909 and the form ID for the template image held in the column 1005 in step S910. The difference image 1001 linked with the form IDs may be held in the column 1004.

Thus, according to one exemplary embodiment, a portion of image data different from the template image is registered on the document management server 407. Accordingly, the amount of data to be registered can be reduced with respect to documents having a content slightly different from each other for a specific page thereof. Thus, the storage area can be more effectively utilized.

The exemplary embodiment having the above-described configuration may be particularly useful with respect to a document that is generated in the form system that inserts data in a template and prints the document having the inserted data.

Yet another exemplary embodiment of the present invention is described below. In the above-described exemplary embodiment, a difference between the template image and the form image is extracted. However, it may also be useful if a form image that has already been registered on the document management server 407 is compared with the form image to be registered on the document management server 407 and a difference image is generated based on a result of the comparison.

Those portions of the configuration of the exemplary embodiment that are similar to those of the exemplary embodiment described above will not be repeatedly described here.

Figure 11:
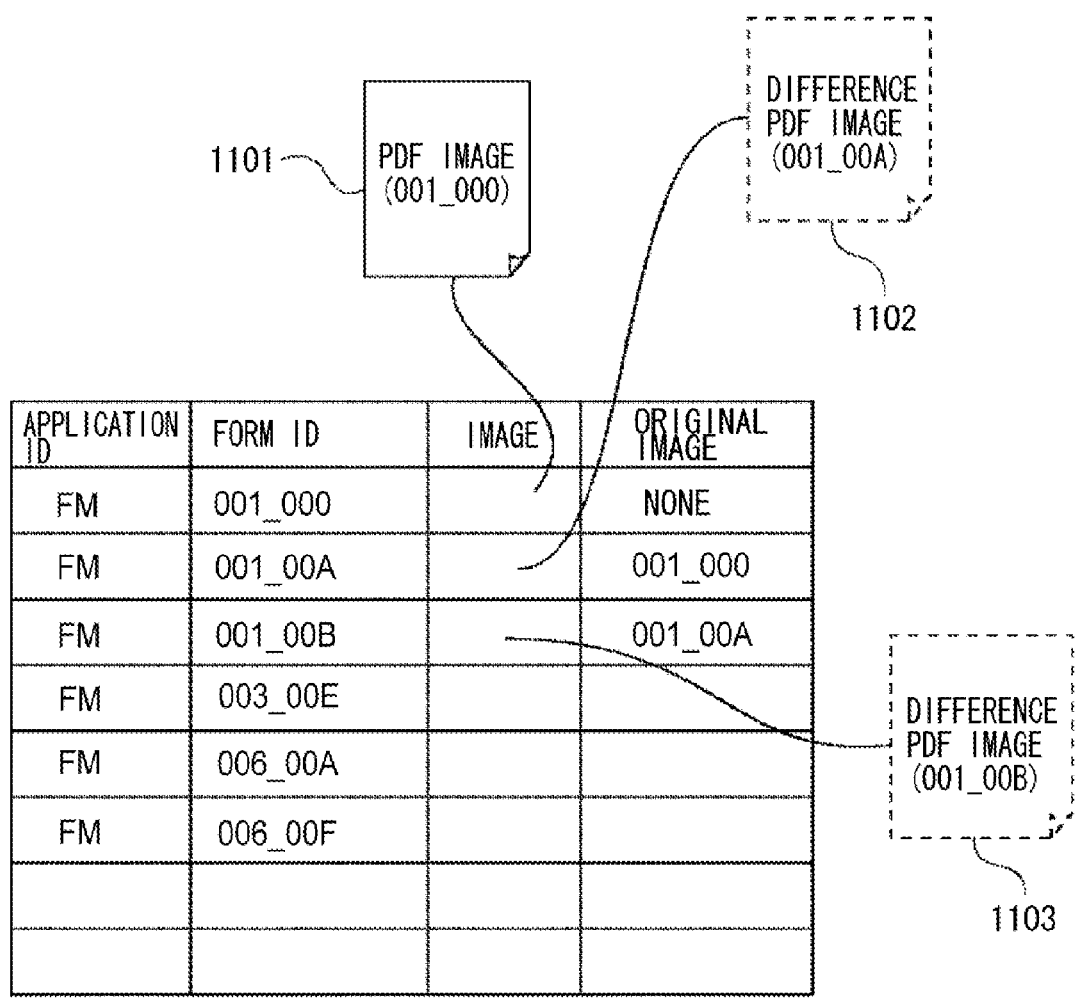
FIG. 11 illustrates an example of tracking information stored on the DB server according to an exemplary embodiment of the present invention.

FIG. 11 illustrates an example of a state of the tracking data storage unit 409 in a pseudo manner in the case where a difference image is generated based on a result of a comparison between the form images, and the thus generated difference image is registered on the document management server 407 according to an exemplary embodiment.

Referring to FIG. 11, form image data 1102 having a form ID "001_00A" is registered on the document management server 407 as the difference image with respect to a template image 1101.

On the other hand, form image data 1103 having a form ID "001_00B" is registered on the document management server 407 as the difference image with the form image data 1102 instead of a template image.

As described above, according to one version of the exemplary embodiment, the difference image is generated based on a comparison between the form images. Accordingly, the size of the difference image can be further reduced compared to the exemplary embodiment above in the case of printing the documents in which most of the content of the data inserted therein is the same. Thus, the present exemplary embodiment may more effectively utilize the resources of storing data such as a hard disk compared to certain exemplary embodiments described above.

According to one exemplary embodiment of the present invention, the form generation system of the present invention includes the information processing apparatus (the client PC 102, the DB server 108, and the form server 111 illustrated in FIG. 1) and the print processing apparatus (the printer 106 illustrated in FIG. 1) includes a template ID embedding unit for embedding a template ID in a form template at the time of generating the form template. In addition, the form generation system may include a form data ID calculation unit for calculating a form data ID at the time of generating a form and a form ID generation unit for generating a form ID based on the template ID and the form data ID.

Further, the form generation system may include a form ID embedding unit for embedding the form ID generated by the form ID generation unit in the form and a difference determination unit for determining a difference between the form having the form ID embedded therein at the time of printing the form and an existing similar form. In addition, the form generation system may include a difference data management unit for managing information about the difference between the form to be printed and the existing form similar thereto, which are linked with each other.

In addition, the form generation system described above can include a template image searching unit configured to search for a template image according to the form ID that has been embedded in the form, at the time of printing the same. Further, the form generation system may include a difference image generation unit for generating a difference image by comparing the searched template image and the image of the form to be printed. In addition, the form generation system may include a difference image management unit for managing the difference image by linking the form ID and the form ID for the template image.

Furthermore, the present invention can be implemented, for example, in a system, an apparatus, a method, a program, or a storage medium storing the program. For example, the present invention can be applied to a system including a plurality of devices as well as to an apparatus that includes one device.

The present invention can be implemented by directly or remotely supplying a program of software implementing functions of the above-described exemplary embodiments to a system or an apparatus and reading and executing supplied program codes with the system or a computer of the apparatus. In this case, the program corresponding to the processing performed according to the flow charts in the drawings is supplied to the system or the apparatus.

Accordingly, the program code itself, which may be installed on the computer for implementing the functional processing according to the present exemplary embodiment of the present invention with the computer, may be capable of implementing embodiments according to the present invention. In one version, an embodiment of the present invention also includes the computer program implementing the functional processing according to the exemplary embodiments of the present invention.

Accordingly, the program can be configured in any form, such as object code, a program executed by an interpreter, and script data supplied to an OS.

As the recording medium for supplying such program code, a floppy disk, a hard disk, an optical disk, a magneto-optical disk (MO), a CD-ROM, a CD-recordable (CD-R), a CD-rewritable (CD-RW), a magnetic tape, a nonvolatile memory card, a ROM, and a DVD (a DVD-ROM and a DVD-recordable (DVD-R)), for example, can be used.

In one embodiment, the above program can also be supplied by connecting to a web site on the Internet by using a browser of a client computer and by downloading the program from the web site to a recording medium such as a hard disk. In addition, the above program can also be supplied by downloading a compressed file that includes an automatic installation function from the web site to a recording medium such as a hard disk.

In one version, the functions of the above embodiments can also be implemented by dividing the program code into a plurality of files and downloading each divided file from different web sites. For example, a WWW server for allowing a plurality of users to download the program file for implementing the functional processing may allow for carrying-out embodiments of the invention.

In yet another version, the above program can also be supplied by distributing a storage medium such as a CD-ROM and the like which stores the program after an encryption thereof; by allowing the user who is qualified for a prescribed condition to download key information for decoding the encryption from the web site via the Internet; and by executing and installing in the computer the encrypted program code by using the key information.

In addition, the functions according to the embodiments described above can be implemented not only by executing the program code read by the computer, but may also be implemented by the processing in which an OS or the like carries out a part of or the whole of the actual processing based on an instruction given by the program code.

Furthermore, in another aspect of an exemplary embodiment of the present invention, after the program code read from the recording medium is written in a memory provided in a function expansion board inserted in a computer or a function expansion unit connected to the computer, a CPU and the like provided in the function expansion board or the function expansion unit carries out a part of or the whole of the processing to implement the functions of the embodiments described above.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2007-283542 filed Oct. 31, 2007, which is hereby incorporated by reference herein in its entirety.

What is claimed is:

1. A form management system comprising:
a printing apparatus comprising:
   a printing and outputting unit configured to print out a form according to a print instruction, the form being generated by overlaying form data on a template; and
   a tracking data sending unit configured to send tracking data of the form printed by the printing and outputting unit to a tracking data storage database,
the tracking data storage database comprising:
   a storage unit configured to store the tracking data;
   an extraction unit configured to extract identifying information of the template from the sent tracking data;
   a determination unit configured to determine whether the extracted identifying information of the template is stored in the storage unit; and
   a difference image generation unit configured to generate a difference image between image data of the identifying information of the template that has already been stored in the storage unit and image data of the sent tracking data in a case where the determination unit determines that the identifying information of the template has been stored in the storage unit,
   wherein the difference image generation unit stores the generated difference image in the storage unit as the image data of the received tracking data.

2. The form management system according to claim 1, wherein the data for printing out the form includes at least one of text data included in the form and image data included in the form.

3. A method for controlling a form management system, the method comprising:
   printing out a form according to a print instruction, the form being generated by overlaying form data on a template;
   sending tracking data of the printed form to a tracking data storage database;
   storing the tracking data in a storage unit;
   extracting identifying information of the template from the sent tracking data;
   determining whether the extracted identifying information of the template is stored in the storage unit;
   generating a difference image between image data of the identifying information of the template that has already been stored in the storage unit and the image data of the sent tracking data in a case where it is determined that the identifying information of the template has been stored in the storage unit; and
   storing the generated difference image in the storage unit as the image data of the received tracking data.

4. The method according to claim 3, wherein the data for printing out the form includes at least one of text data included in the form and image data included in the form.

5. A non-transitory computer-readable storage medium storing computer-executable instructions for controlling a form management system, the computer readable storage medium comprising:
   computer-executable instructions for printing out a form according to a print instruction, the form being generated by overlaying form data on a template;
   computer-executable instructions for sending tracking data of the printed form to a tracking data storage database;
   computer-executable instructions for storing the tracking data in a storage unit;
   computer-executable instructions for extracting identifying information of the template from the sent tracking data;
   computer-executable instructions for determining whether the extracted identifying information of the template is stored in the storage unit;
   computer-executable instructions for generating a difference image between image data of the identifying information of the template that has already been stored in the storage unit and the image data of the sent tracking data in a case where it is determined that the identifying information of the template has been stored in the storage unit; and
   computer-executable instructions for storing the generated difference image in the storage unit as the image data of the received tracking data.

6. The non-transitory computer-readable storage medium according to claim 5, wherein the data for printing out the form includes at least one of text data included in the form and image data included in the form.

* * * * *